(12) United States Patent
Cavagnaro et al.

(10) Patent No.: US 7,711,743 B2
(45) Date of Patent: May 4, 2010

(54) PROCESS AND SYSTEM THAT DYNAMICALLY LINKS CONTENTS OF WEBSITES TO A DIRECTORY RECORD TO DISPLAY AS A COMBINED RETURN FROM A SEARCH RESULT

(75) Inventors: James E. Cavagnaro, Pittsford, NY (US); Daniel J. Erb, Rochester, NY (US); Robert C. Tobey, Scottsville, NY (US)

(73) Assignee: Telecom Consulting Group N.E. Corp., Rochester, NY (US)

( * ) Notice: Subject to any disclaimer, the term of this patent is extended or adjusted under 35 U.S.C. 154(b) by 1121 days.

(21) Appl. No.: 11/013,098

(22) Filed: Dec. 15, 2004

(65) Prior Publication Data

US 2005/0131909 A1    Jun. 16, 2005

Related U.S. Application Data

(60) Provisional application No. 60/529,849, filed on Dec. 15, 2003.

(51) Int. Cl.
*G06F 17/30* (2006.01)
(52) U.S. Cl. ............. 707/769; 707/760; 707/770; 709/202
(58) Field of Classification Search ............. None
See application file for complete search history.

(56) References Cited

U.S. PATENT DOCUMENTS 5,935,210 A * 8/1999 Stark ............ 709/224

(Continued)

OTHER PUBLICATIONS

Planet Discover, "Welcome to Planet Discover", http://www.planetdiscover.com/index.jsp, Apr. 4, 2005.

(Continued)

*Primary Examiner*—Don Wong
*Assistant Examiner*—Shyue Jiunn Hwa
(74) *Attorney, Agent, or Firm*—Heslin Rothenberg Farley & Mesiti P.C.

(57) ABSTRACT

A search of information collected from a root URL (Websites, Web pages, documents or database fields) is dynamically linked back to a directory (contact) record where information from both data sets are displayed to the end user who is performing the search. Additional information can be displayed as it relates to each contact.

The dynamic linking includes importing a plurality of directory (contact) records with assigned IDs into a first table of a database and defining a group of root URLs with assigned IDs into a second table of the database. Establishing a coordinating third table of the database to link each of the directory (contact) records with root URLs, thus allowing directory (contact) records to share root URLs. Each root URL is spidered to capture target content (all Web pages within a Website, documents within a directory or content within an individual document) and links the content found to the root URL. The content is parsed, broken down into text and stored in a fourth table of the database. Links between the first, second, and fourth tables are established in the coordinating third table.

A response to a search request includes searching the first and fourth tables for a target containing corresponding data in the tables and the search term and, if a target with corresponding data is found, the target and the appropriate directory (contact) record(s) linked to the targets root URL is then displayed in response to the search request.

12 Claims, 11 Drawing Sheets

U.S. PATENT DOCUMENTS

| | | | | |
|---|---|---|---|---|
| 6,499,026 B1 * | 12/2002 | Rivette et al. | ............ | 707/2 |
| 6,516,337 B1 * | 2/2003 | Tripp et al. | ............ | 709/202 |
| 6,769,009 B1 * | 7/2004 | Reisman | ............ | 709/201 |
| 6,839,680 B1 * | 1/2005 | Liu et al. | ............ | 705/10 |
| 7,117,227 B2 * | 10/2006 | Call | ............ | 707/104.1 |
| 7,136,875 B2 * | 11/2006 | Anderson et al. | ............ | 707/104.1 |
| 7,139,811 B2 * | 11/2006 | Lev Ran et al. | ............ | 709/217 |
| 7,167,920 B2 * | 1/2007 | Traversat et al. | ............ | 709/230 |
| 7,197,565 B2 * | 3/2007 | Abdelaziz et al. | ............ | 709/226 |
| 7,249,315 B2 * | 7/2007 | Moetteli | ............ | 715/234 |
| 7,493,308 B1 * | 2/2009 | Bair et al. | ............ | 707/3 |
| 2002/0169889 A1 * | 11/2002 | Yang et al. | ............ | 709/244 |
| 2003/0033367 A1 * | 2/2003 | Itoh | ............ | 709/203 |
| 2003/0097564 A1 * | 5/2003 | Tewari et al. | ............ | 713/171 |
| 2004/0044747 A1 * | 3/2004 | Trevor et al. | ............ | 709/217 |
| 2004/0205496 A1 * | 10/2004 | Dutta et al. | ............ | 715/501.1 |

OTHER PUBLICATIONS

Planet Discover, "Integrated Search Platform", http://www.planetdiscover.com/sms_landing.html, Apr. 4, 2005.

Planet Discover, "Providing Leading Edge Technology for Your Local Search Needs", http://www.planetdiscover.com/about_landing.html, Apr. 4, 2005.

TRIANGLE.COM "Monday's Highlight: Travel", http://www.triangle.com/, Apr. 4, 2005.

STARTRIBUNE.COM "Shopping and Classifieds", http://www.startribune.com/shopping/, Apr. 4, 2005.

STARTRIBUNE.COM "Shopping and Classifieds", http://pd.startribune.com/sp?keywords=pizza&x=4&y=7, Apr. 4, 2005.

Google, "Google Local Beta", http://www.google.com/lochp?hl=en&tab=wl&q=, Apr. 4, 2005.

Google, "Google Local Beta", http://www.google.com/local?sc=1&hl=en&q=pizza&near=poughkeepsie%2C+NY&btnG=Google+Search&rl=1, Apr. 4, 2005.

* cited by examiner

FIG. 3

| online banking | [🔍 Search] Advanced Search |

Last Text Searches: Uniform, Uniforms, Glass, Enterprise, Accountant, devil

Results 1 - 8 of 8  (Exact Match)

Click a category below to filter the results.

Banks - 2                                              Printers - 1
Insurance - 2
Insurance-Suburban - 2
Loans - 1
Mortgages - 1

All Businesses

Summit Federal Credit Union The    Phone: 585 453 7010
   The Summit Federal Credit Union 🗎
   ONLINE Rates Calculators FAQ Newsletter Locations & Hours What's New Member ONL
   Survey Career ...
   Meta: Rochester, NY. Providing loans, savings, checking, Visa, cer...
   www.summitfcu.org/   (82k) 11/25/2003

A Christina Breen-Hale    Phone: 585 352 7400
   State Farm - Getting Started 🗎
   ... Bank® Get rates for our BANKING products and then learn more about what we offer,
   including ONLINE BANKING with FREE ONLINE bill pay. For a quick look at ONLINE
   BANKING, take the BANKING ...
   www.statefarm.com/getstart.htm   (42k) 12/1/2003

Travis Van    Phone: 585 461 5240
   State Farm - Getting Started 🗎
   ... Bank® Get rates for our BANKING products and then learn more about what we offer,
   including ONLINE BANKING with FREE ONLINE bill pay. For a quick look at ONLINE
   BANKING, take the BANKING ...
   www.statefarm.com/getstart.htm   (42k) 12/1/2003

State Farm Mutual Automobile Insurance Co    Phone: 585 217 9520
   State Farm - Getting Started 🗎
   Bank® Get rates for our BANKING products and then learn more about what we offer

FIG. 6

| Uniform | Search! Advanced Search |

Last Text Searches: Uniforms, Glass, Enterprise, Accountant, devil, thai

Results 1 - 8 of 8 (Exact Match)

Premier Businesses

---

Cintas-The Uniform People
📞 800 445 6271

| 209 Bourne Av Ste B<br>Savannah, GA | • Guaranteed satisfaction<br>• Rental & purchase programs available<br>• Design |

Company Description: The right image to fit your business

Web Page Match www.cintas-corp.com/
UNIFORM Programs Programs for National Companies Cleanroom Resources Flame Resistant Clothing ...
Meta: Cintas is the world's largest public uniform company, with 1,700 representatives...

Yellow Page Ad | Map | More Info

---

Orkin Exterminating Co Inc
📞 912 876 2342

| Hinesville, GA 31313 | • Residential/commercial<br>• Termites & roaches<br>• Other pests |

Company Description: 100 years of service

Web Page Match www.orkin.com/pages/why_orkin.asp
... treatment types and changing pest behavior and conditions. Before they wear the distinctive Orkin UNIFORM, each technician is security screened, drug tested and fully bonded and insured. Satisfaction ...
Meta: Fireworks Splice HTML

Yellow Page Ad | More Info

FIG. 7

High Tech Search
Unleash the power of technology

Search Results
Home

Search Words: Jim Cavagnaro    Search Help
Results Per Page: 20  Summaries: Show  Sort By: Relevance  Search

Search results for '(Jim Cavagnaro)'                    Search took 0.047 seconds Documents 1 - 6 of 6 matches. More ✶'s indicate a better match.
Sort By: Relevance/Date/Domain - Hide Summary.

TCN - Contact Us Page ✶
... Fax: 585-424-5388 Direct link to our Contact Us form Company E-mail Directory Administrative Jim Cavagnaro, CEO jcavagnaro@tcnus.com Patty Gotham, Controller pgotham@tcnus.com Mary Ann ...
Meta: A professional service organization help desk services, network and computer sup...
www.tcnus.com/contactus.htm (2k) Tuesday, October 21, 2003

HTBC - Board of Directors ✶
... his wife, Dennie, in Honeoye Falls, N.Y. They have three daughters, and six grandchildren. Jim Cavagnaro Treasurer Jim Cavagnaro is founder and CEO of TCN, a technology-consulting network ...
www.htbc.org/board.htm (5k) Monday, August 04, 2003

New IT Cluster Logo ✶
... cluster Technology Registry Mission Organization Code of Conduct Logos Organization 2003 - 2004 Jim Cavagnaro, CEO of TCN is the High Tech Business Council's Treasurer and has been elected ...
www.htbc.org/itorg.htm (1k) Monday, August 04, 2003

HTBC Member Company Profile ✶
Jim Cavagnaro Contact Title: CEO Phone: 585-424-5090 Fax: 585-424-5388 Email: jcavagnaro@tcnus.com ...

techtrac.htbc.org/HTS/Profile.asp?CompID=12... (7k) Thursday, December 04, 2003

PROCESS AND SYSTEM THAT DYNAMICALLY LINKS CONTENTS OF WEBSITES TO A DIRECTORY RECORD TO DISPLAY AS A COMBINED RETURN FROM A SEARCH RESULT

CROSS REFERENCE TO RELATED APPLICATIONS

This application claims the benefit of U.S. Provisional Application No. 60/529,849 files Dec. 15, 2003.

TECHNICAL FIELD

The present invention relates to a search of information collected from a root URL (Websites, Web pages, documents or database fields) and the dynamic linking of this information back to a directory (contact) record where information from both data sets are displayed to the end user who is performing the search. Additional information can be displayed as it relates to each contact.

BACKGROUND OF THE INVENTION

The Internet is being used by various individuals and entities such as groups of businesses and universities to assist them in searching the World Wide Web (WWW). However, in the past the information returned by such search engines has been limited to the display of the Universal Resource Locator (URL) of Web pages.

Similarly, more structured listings, such as the yellow pages, generally provide search results which are limited to the information in the paper versions of the listings.

It is a principal object of the present invention to provide a process and system for displaying additional search result information from searches performed on associated Web pages, online yellow pages, and similar groups of Websites.

SUMMARY OF THE INVENTION

Briefly described, a method to dynamically link a directory (contact) record (contact information) to a plurality of URLs includes importing a plurality of directory (contact) records with assigned IDs into a first table of a database and defining a group of root URLs with assigned IDs into a second table of the database. Establishing a coordinating third table of the database to link each of the directory (contact) records with root URLs, thus allowing directory (contact) records to share root URLs. Each root URL is spidered to capture the content of the root URL (all Web pages within a Website, documents within a directory or content within an individual document) as discovered during the spidering process. The content is parsed, broken down into text and stored in a fourth table of the database which contains the content of the targets. Links between the first, second and fourth tables are established in the coordinating third table.

A response to a search request includes searching the first and fourth tables for a target containing corresponding data in the tables and the search term and, if a target with corresponding data is found, the target and the appropriate directory (contact) record(s) linked to the targets root URL is then displayed in response to the search request.

BRIEF DESCRIPTION OF THE DRAWINGS

The accompanying drawings, which are incorporated into and form a part of the specification, illustrate several embodiments of the present invention and together with the description, serve to explain the principles of the invention. The drawings are only for the purpose of illustrating a preferred embodiment of the invention and are not to be construed as limiting the invention. In the drawings:

FIG. 3 is a portion of a Web page showing another search result from a search performed on the Web page of FIG. 1;

FIG. 6 is a portion of a Web page showing a portion of a search result according to the present invention from a yellow pages Web site;

FIG. 7 is a portion of a Web page showing a portion of another search result according to the present invention from a yellow pages Web site;

FIG. 11 is a portion of a Web page showing a portion of a search result according to the present invention from another association Web site;

FIG. 12 is a portion of a Web page produced by clicking a link in the Web page shown in FIG. 11;

FIG. 13 is a portion of a Web page produced by clicking a link in the Web page shown in FIG. 12;

DESCRIPTION OF THE PREFERRED EMBODIMENT

Figures 1, 8:
FIG. 1 is a portion of a Web page for as association with a search capability for use with the present invention.
FIG. 8 is a portion of a Web page produced by clicking a link in the Web page shown in FIG. 7.

The present invention is a process and system that dynamically links a directory (contact) record to all text contained within the scope of a root URL (Websites, Web pages, documents or database fields) creating an aggregate profile. When searching a collection of root URLs, from the Internet or an Intranet, a search engine finds text from the aggregate profile and displays both the directory (contact) record and the target when a matching result is found. The results display selected parts of the directory (contact) record and all or a portion of the matching target as described in more detail below.

A directory (contact) record may include any or all of the following; name, company, address, phone, cell phone, fax, email, Website, company description, categories or market segment identifiers (SIC, NASIC or Yellow page category) and graphic files (logo's advertising files). Each directory (contact) record is assigned an ID. Information from the directory (contact) records are imported or created directly in the first table of the database. Information contained in the directory (contact) record can be preloaded to the database or collected through the Internet/Intranet enabling direct input by a responsible party of the root URL.

TABLE 1 directory (contact) record

| DirID | Name | Company | Address | City | State | Zip code | Phone |
|---|---|---|---|---|---|---|---|
| 1024 | Jim Cavagnaro | TCN | 1240 Jefferson Rd | Rochester | NY | 14623 | 585-424-5090 |

A root URL can be a network location, Website, a directory within a Website, an individual Web page, document, or field in a database. Document types include document formats such as ASP, Excel, HTML, MS Word, PDF, Rich Text, Text, and many others.

A root URL is assigned an ID and inserted as a field in a second table of the database. The content of each root URL is captured using what is commonly known as a "spider". The spider parses individual target documents or fields for content within the scope of the root URL. This content is parsed and broken down into text and stored in a fourth table of the database maintaining the original root URL ID of each target found. This process is commonly known as "spidering".

TABLE 2

For a document on a server or PC

| RootURLID | Network address |
|---|---|
| 1177 | C:\My Documents\JimsBio.doc |

TABLE 2

For a (Website)

| RootURLID | Website address |
|---|---|
| 1222 | www.tcnus.com |

TABLE 4

(Target)

| RootURLID | Address | All indexed content |
|---|---|---|
| 1222 | www.tcnus.com | Text in any language |

*The "spider" inserts all indexed content into this field of the fourth table.

A coordinating table three is established to link the first, second and fourth tables. After the spidering has been completed, an external search/match process that compares the root URL of the directory (contact) record from the first table with the target content that has been indexed in the fourth table and the root URL of the target and creates an association (link) between the two tables. This allows for the creation of an aggregate profile(s) for each entry that contains information from both tables. This aggregate profile can now be displayed from a search, where a match is found. The aggregate profile can be displayed in many ways.

TABLE 3

| DirID | RootURLID |
|---|---|
| 1024 | 1177 |

Archive(s) refers to collections of root URLs. Archives are re-indexed on a scheduled basis and the relationship between any new content and the original directory (contact) record is dynamically maintained.

The system is used in an interface for visitors to search archives. Sample: search for Jim Cavagnaro as shown in FIG. 1 which is a portion of a Web page for an association with a search capability for use with the present invention.

Figure 2:
FIG. 2 is a portion of a Web page showing a search result from a search performed on the Web page of FIG. 1.

Through the Inter/Intranet visitors to the Web Portal search for information and when matching results are found, display information from the aggregate profile. The results will consist of a display of all or a portion of the fields from the directory (contact) record and all or a portion of the fields from the target as shown in FIG. 2 which is a portion of a Web page showing a search result from a search performed on the Web page of FIG. 1.

Figure 3:
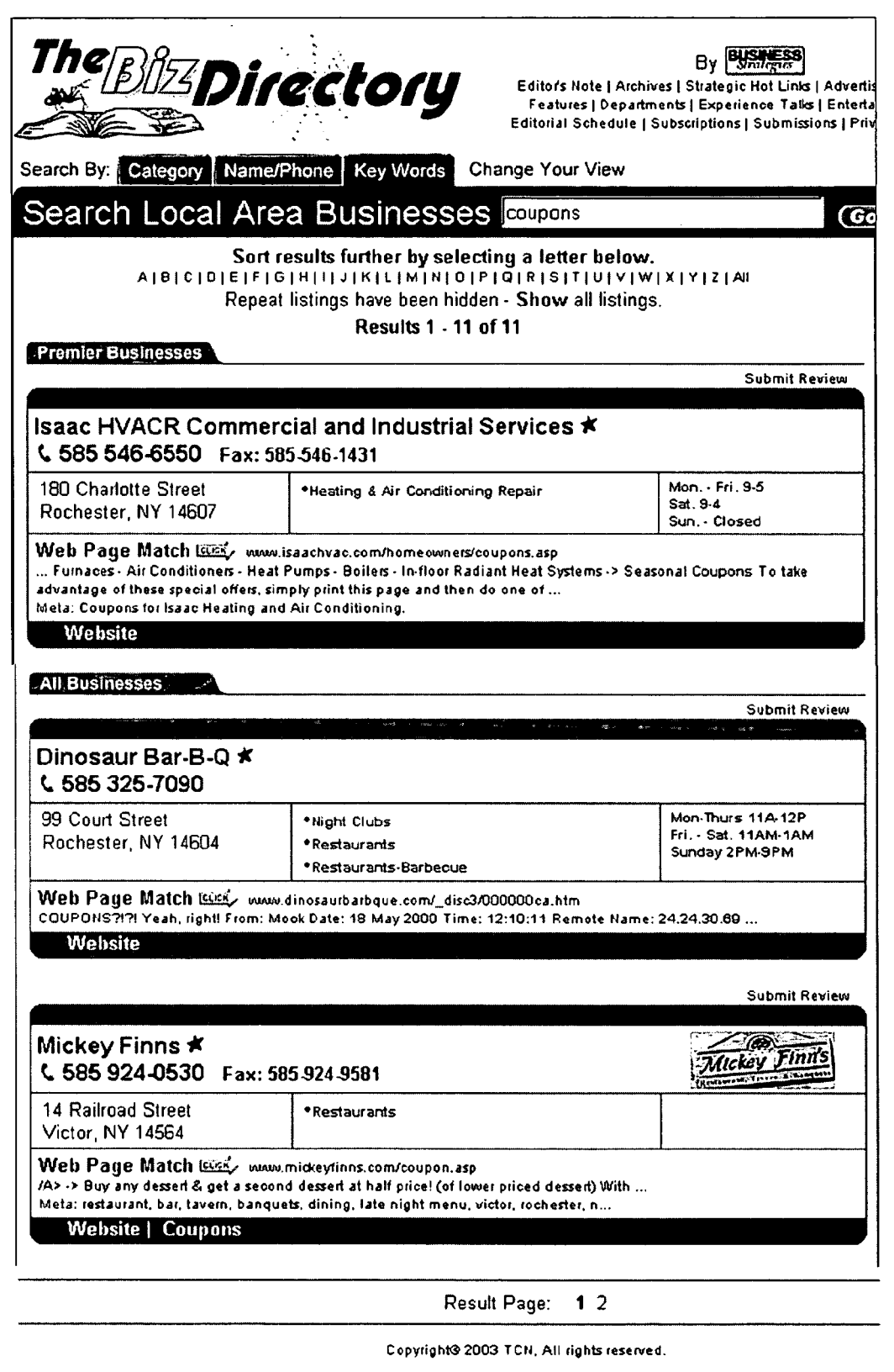

Therefore, adding a search engine to a Website or creating a Web Portal representing groups of Websites eases navigation and helps visitors locate exactly the information they are looking for. Having contact information immediately available is a significant advantage from existing search engine technology. An example of such contact information is shown in FIG. 3 which is a portion of a Web page showing another search result from a search performed on the Web page of FIG. 1.

The present invention can be used for the following example applications:
1) Adding search to an individual Website and provide a point of contact for each Web page.
2) Developing Web Portals to search (groups) and provide contact information.
   a) Member based organizations, or associations.
   b) Colleges and Universities.
   c) Regional government service providers.
3) Developing Web Portals to search documents on servers through an Intranet or secure or open Internet connection. Such portals can be used to search resumes in MS Word format collected from the Web. The information management tool can search directories of various formats including HTML, Word, PDF files, etc. These files can be located in different servers and aggregated into one search.
4) Developing Web Portals for advanced online Yellow Page directories for the Telecommunications, Internet and Search engine Industries—Those providers who publish or wish to publish Yellow Page directories on the Internet. Provide a search of designated Websites and show traditional Yellow Page directory information in the search results.

Once the targets and directory (contact) records are linked, matching results can be displayed in any order, and in various types of format. The following samples represent only a few of the ways an aggregate profile can be displayed.

Figures 4, 5:
FIG. 4 is a portion of a Web page showing an example search result according to the present invention.
FIG. 5 is a portion of a Web page showing another example search result according to the present invention.

Sample 1—Online Yellow Page Directory Listings—matching search results display a one or two line summary (snippet) of the Web page, Meta description (if available), and directory information. FIG. 4 shows search aggregate profiles for Jim Cavagnaro display directory (contact) record and Web page snippet. Also provide a link to the Web page where actual results were found and display directory (contact) record as shown in FIG. 5.

Sample 2—display—Search advertisers Websites for "online banking", display company name and phone with Web page snippet as shown in FIG. 6. Link to an aggregate profile or directory (contact) record and show the full Web page where results are found.

Sample 3—Search for "Uniform"; show directory (contact) record and Web page snippet as shown in FIG. 7. The "More Info" Link displays additional information on an individual listing, which may include; logo, business name, address, phone and fax number, categories, company description, and links to Website, advertising graphics, map, and other Branches/divisions as shown in FIG. 8.

Figure 9:
FIG. 9 is a portion of a Web page showing a portion of a search result according to the present invention from a university association Web site.
Figure 10:
FIG. 10 is a portion of a Web page produced by clicking a link in the Web page shown in FIG. 9.

Sample 4—For universities—A search for "Biometric authentication" displays matching Web page results with links to the full Web page and contact information as shown in FIG. 9. When visitors select a result display the full Web page with contact information (name, email). "Click Here To Contact Us" shows more contact information and provides a form for visitors to ask questions, seek help, or inquire about licensing opportunities as shown in FIG. 10.

Figures 12, 13:
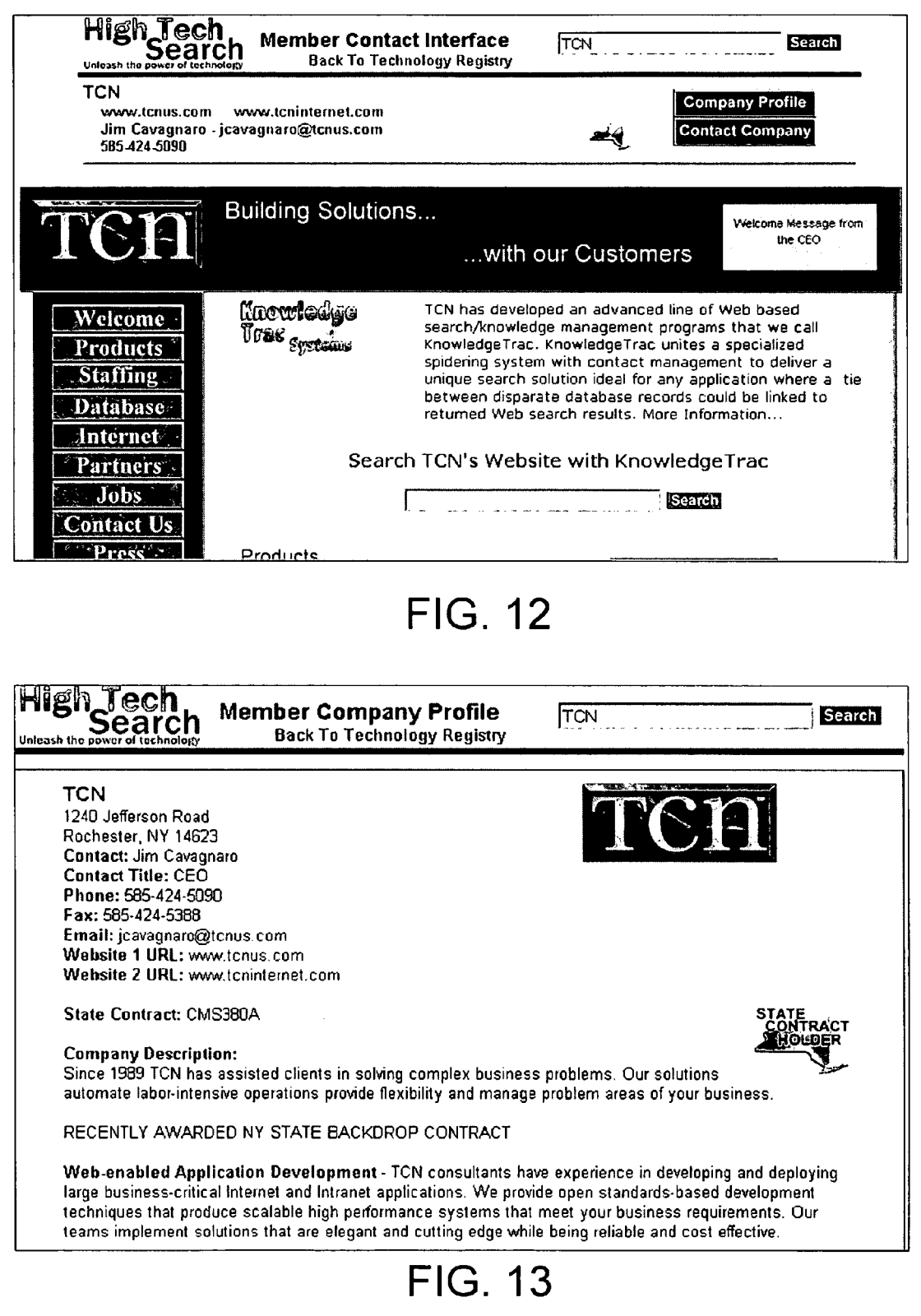

Sample 5—For associations, member-based organizations or other logical groups—an online directory, that enables visitors to search aggregate profiles to find products skills and services of members. This site allows members to directly input and maintain their contact information through a secure Internet connection as shown in FIG. 11. The first matching search result can be selected by clicking on www.tcnus.com/contactus.htm. The page shown in FIG. 12 now displays an aggregate profile showing the Web page linked to contact information. With the system of the present invention a search is able to display the full Web page where actual results are found with contact information listed at the top of the page. By clicking on the contact link "Company Profile" visitors are provided an expanded contact profile as shown in FIG. 13. This directory (contact) record is managed by the member.

Figures 14, 15:
FIG. 14 is a portion of a Web page showing a portion of a search result according to the present invention from a Web site with a list of resumes.
FIG. 15 is a portion of a Web page produced by clicking a link in the Web page shown in FIG. 14.

Sample 4—Display multiple records directly in the results as shown in FIG. 14. In this example, MS Word documents stored on a server, are converted to text, "spidered" and become searchable through the Internet or an Intranet. Clicking on the "profile" link displays a complete Applicant Profile as shown in FIG. 15.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method to dynamically link a directory (contact) record to a plurality of root URLs comprising the steps of:
   a) importing a plurality of directory (contact) records, each with an assigned directory ID, into a first table of a web portal's database;
   b) defining a group of root URLs, each with an assigned root URL ID, into a second table of the web portal's database;
   c) using the web portal, spidering each of said root URLs and capturing a target content of each of said root URLs and any new targets linked to said root URLs as discovered during spidering;
   d) using the web portal, parsing, breaking down into text and storing said captured target content of each of said root URLs and any linked targets into a fourth table of the database and inserting the root URL ID spidered for each record;
   e) using the web portal, comparing each directory (contact) record from the first table with the captured target content from each of the spidered URLs in the fourth table and creating one or more linking associations between one or more directory (contact) records of the first table and captured target content of the fourth table where there is a match;
   f) using the web portal, establishing a coordinating third table of the web portal's database to link the first, second, and fourth tables based on:
      1) the one or more linking associations between directory (contact) records of the first table and captured target content of the fourth table; and
      2) the spidered URLs for each record in the fourth table which correspond to the root URLs in the second table;
   thereby allowing:
      a single directory (contact) record to share a plurality of root URLs; or
      a single root URL to share a plurality of directory (contact) records.

2. The method of claim 1 wherein said step of defining a group of root URLs into the second table of the web portal's database comprises the step of collecting targets in said plurality of directory (contact) records, each of said targets corresponding to one of said group of root URLs.

3. The method of claim 2 wherein said fourth table content includes a root URL for each of said group of targets, each of said targets comprising one of said root URLs in said plurality of directory (contact) records.

4. The method set forth in claim 1 further including the step of adding targets to said group of root URLs during said spidering operation, said additional targets comprising content found on a target being spidered, said found target also spidered and contents of said found target being captured, parsed, broken down into text and stored in said fourth table along with a root URL ID, said root URL ID being the one of said root URLs linked to said plurality of directory (contact) records from which said spidering operation was begun that produced said found target.

5. The method of claim 1 including the additional step of adding information to one of said plurality of records after said first table is initially formed.

6. The method set forth in claim 1 wherein the match which results in a linking association is a match of URLs.

7. The method of claim 1, wherein the plurality of directory (contact) records comprises a plurality of yellow page directory listings.

8. A method of searching a directory (contact) record comprising:
   a) providing a plurality of directory (contact) records stored in a first table of a web portal's database dynamically linked to a plurality of root URLs in a second table of said web portal's database by a third coordinating table of said web portal's database wherein each of said root URLs have been spidered and the contents of a target of each of said root URLs as well as the root URL have been captured in a fourth table of said database and wherein the third coordinating table is established based on one or more linking associations between one or more directory (contact) records of the first table and captured target content of the fourth table where there is a match in conjunction with the spidered URLs for each record in the fourth table which correspond to the root URL's in the second table;

b) using the web portal, receiving at least one search term in a search request and searching the captured content in said fourth table for said at least one search term;

c) using the web portal, finding at least one directory (contact) record in said first table which is linked to any of the root URLs which have captured content corresponding to said at least one search term;

d) using the web portal, providing said at least one directory (contact) record to an entity providing said at least one search term; and e) searching said directory (contact) records for a correspondence between the content of each of said directory (contact) records and providing any directory (contact) record for which a correspondence is found to the entity providing said at least one search term.

9. The method of claim 8 wherein said information provided to said entity providing said search request includes words surrounding said at least one search term found in said fourth table.

10. The method of claim 8 wherein said information provided to said entity providing said at least one search term includes information added to said at least one directory (contact) record after said first table is initially formed.

11. The method of claim 8, wherein the plurality of directory (contact) records comprises a plurality of yellow page directory listings.

12. A method to dynamically link a yellow page directory listing to a plurality of root URLs comprising the steps of:

a) importing a plurality of yellow page directory listings, each with an assigned directory ID, into a first table of a web portal's database;

b) defining a group of root URLs, each with an assigned root URL ID, into a second table of the web portal's database;

c) using the web portal, spidering each of said root URLs and capturing a target content of each of said root URLs and any new targets linked to said root URLs as discovered during spidering;

d) using the web portal, parsing, breaking down into text and storing said captured target content of each of said root URLs and any linked targets into a fourth table of the database and inserting the root URL ID spidered for each record;

e) using the web portal, comparing each yellow page directory listing from the first table with the captured target content from each of the spidered URLs in the fourth table and creating one or more linking associations between one or more yellow page directory listings of the first table and captured target content of the fourth table where there is a match;

f) using the web portal, establishing a coordinating third table of the web portal's database to link the first, second, and fourth tables based on:

1) the one or more linking associations between yellow page directory listings of the first table and captured target content of the fourth table; and 2) the spidered URLs for each record in the fourth table which correspond to the root URLs in the second table;

thereby allowing:

a single yellow page directory listing to share a plurality of root URLs; or a single root URL to share a plurality of yellow page directory listings.

* * * * *